April 10, 1945.  G. C. SAUL ET AL  2,373,144
AUTOMATIC STEERING DEVICE
Original Filed June 22, 1938   2 Sheets-Sheet 1
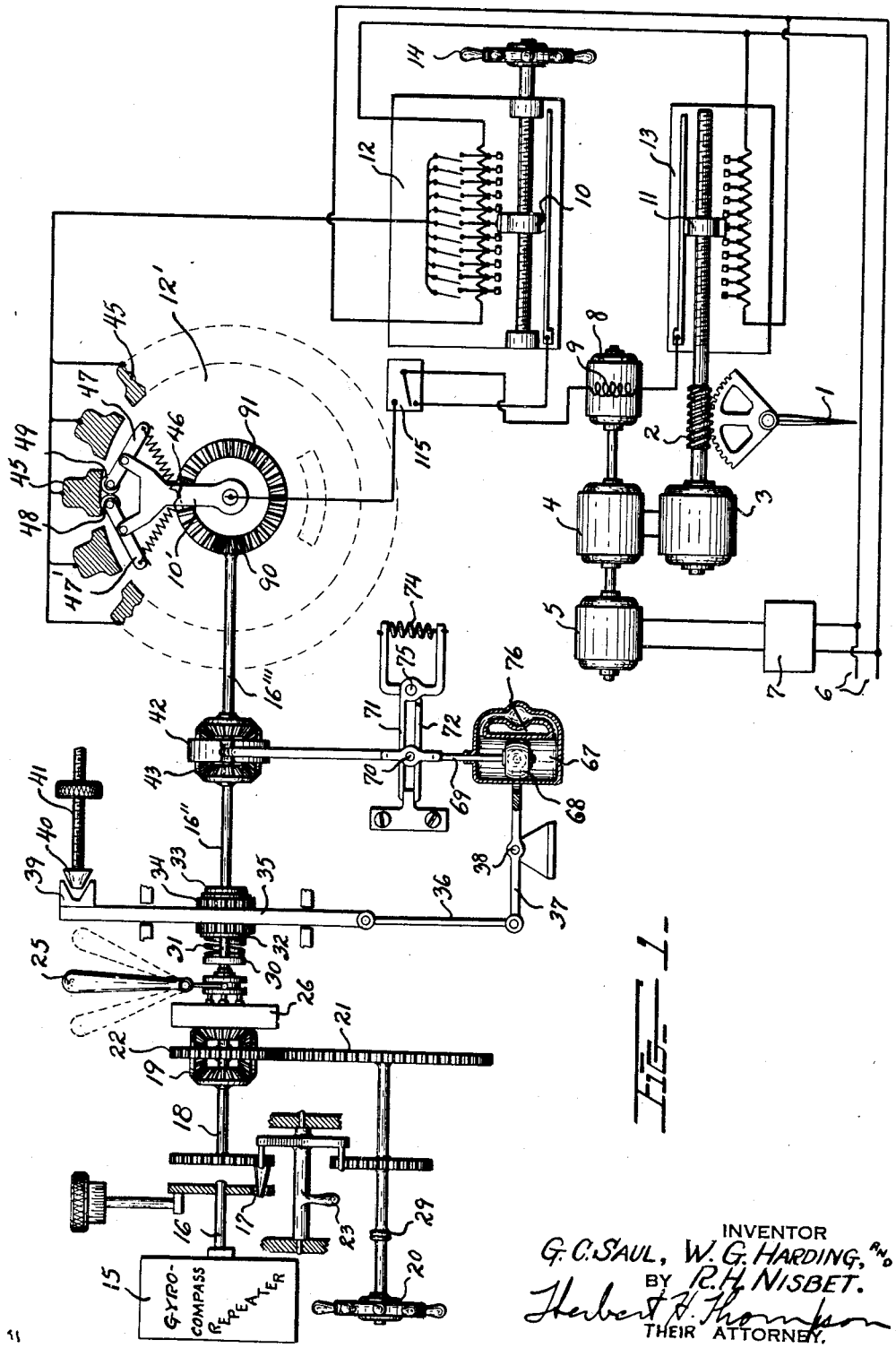
INVENTOR
G. C. SAUL, W. G. HARDING, AND
BY R. H. NISBET.
Herbert H. Thompson
THEIR ATTORNEY.

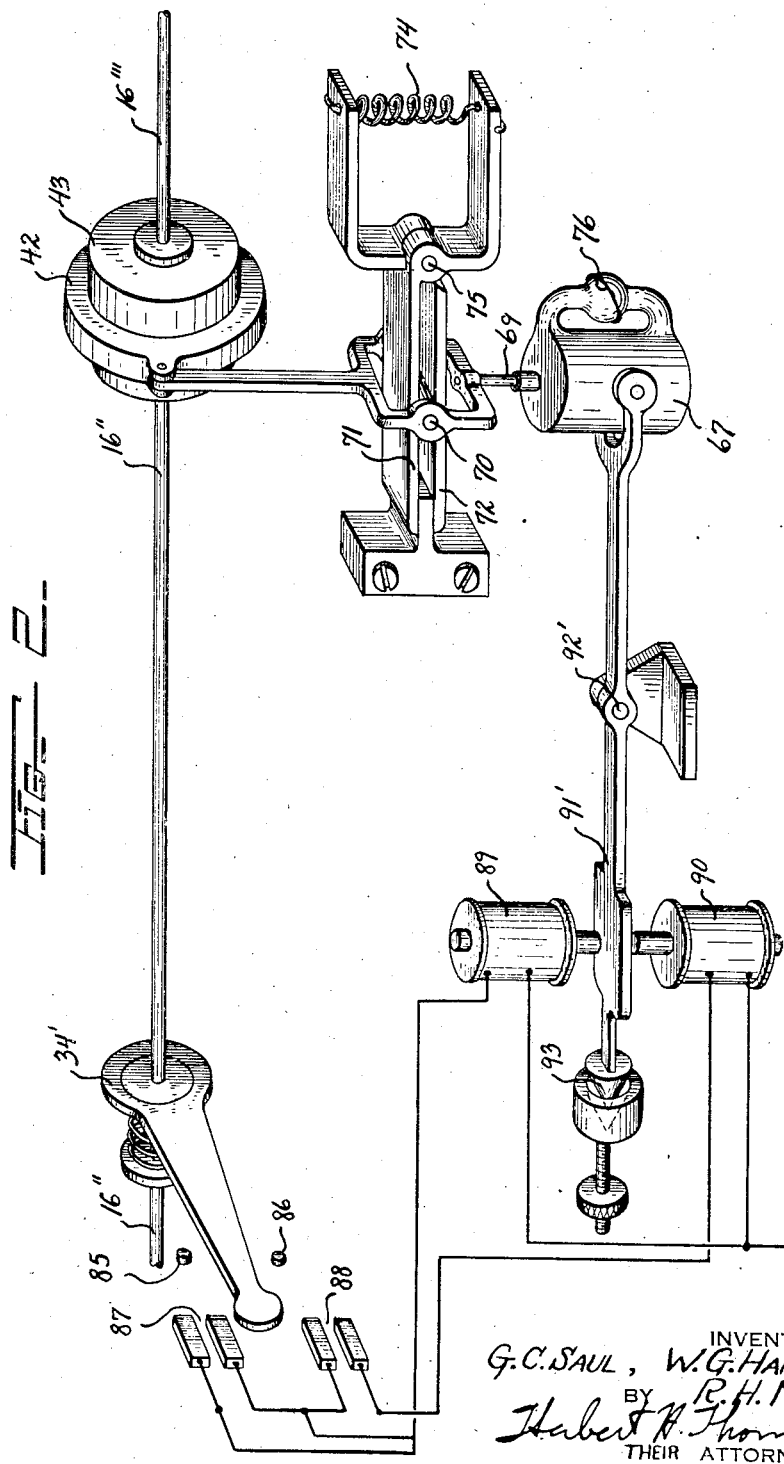

Patented Apr. 10, 1945

2,373,144

UNITED STATES PATENT OFFICE 2,373,144

AUTOMATIC STEERING DEVICE

George Cecil Saul, Beckenham, William George Harding, Whitton, and Robert Hayes Nisbet, Stroud, England, assignors to Sperry Gyroscope Company, Inc., Brooklyn, N. Y., a corporation of New York Continuation of application Serial No. 215,282, June 22, 1938. This application October 14, 1941, Serial No. 414,936. In Great Britain June 22, 1937

6 Claims. (Cl. 172—282)

This invention relates to automatic steering systems for ships, that is, particularly concerned with the provision of means for suppressing the yaw of automatically steered ships. We have shown our invention as applied to a Ward-Leonard electrical system of ship steering but it will be obvious from the following description that it is also applicable to other types of automatic steering gear, such as shown in Sperry Patent 1,695,615, for Automatic steering for dirigible craft, dated December 18, 1928. By using a Ward-Leonard system with balanced potentiometers at the automatic pilot and rudder, we avoid the use of mechanical follow-back connections from the rudder to the pilot house, as shown in said patent, and therefore have not shown the usual lost motion connection in such follow-back connection for effecting the suppression of ship's yaw. In order to accomplish this purpose, we do not merely operate the controller proportionally to the angular displacement of the change from course or in other words proportional to the movement of the compass repeater motor, but impart an additional movement or offset in accordance with and upon reversal of the direction of the rotation of the repeater motor, which of course takes place upon reversal in the direction of yaw of the ship or the craft. This additional movement is applied either to the trolleys or cams operated by the repeater motor, or to the otherwise stationary contact portion of the master controller. The present case is a continuation of abandoned application Serial No. 215,282, filed June 22, 1938, for Automatic steering systems.

One method of carrying this into effect is to arrange a "drag" or slip friction connection which is dragged around by the rotation of the repeater motor shaft until it meets a contact, which acts as a stop preventing further rotation. Two such stops are arranged to limit the motion of the arm in either direction. The arm therefore makes contact with one or other of these stops, according to the direction of rotation of the shaft. The two contacts may be connected to solenoids, and the arm and the solenoids are connected to a source of supply of electricity. According, therefore, to the direction of rotation of the repeater—that is, according to the direction of turn or yaw of the ship—one or other of these solenoids will be energized, and will attract an armature in one direction or the other: The armature is mechanically connected to the contact ring, and therefore rotates this in accordance with the direction of turn of the ship, thus imparting a relative movement between the trolley and contact ring, in addition to the movement which is proportional to the angular rotation of the repeater.

Suppose that the ship has turned off its course to starboard and the controller has applied rudder to check this turn. The turning movement of the ship slows down, stops, and reverses, as the ship begins to return to its course. When the repeater motor reverses its direction of motion the drag contact is dragged in the reverse direction to make the opposite contact. The stationary contacts are therefore quickly moved by the action of the solenoids. The direction of motion is arranged to be such as to take off a substantial amount of rudder. The result is that during the return of the ship to its course less rudder is used than in the corresponding stages of the ship's departure from its course, so that, on the whole, energy is abstracted from the motion, and the side to side oscillation is damped. In the final stages of the return to the course, check rudder will even be applied.

Adjustable stops may be fitted to limit, as required, the amount of this additional movement of the stationary contacts, and therefore limit the initial rudder movement when the direction of motion of the ship changes. Preferably these are arranged to adjust the additional movement to correspond to one or other integral multiple of the angular spacing between one of the controller contacts and its neighbor.

An alternative arrangement, which can be used if the repeater motor is sufficiently powerful, is to arrange that the drag member, which, in the system just described, operated electric contacts to operate solenoids to turn the stationary contact ring, turns the stationary ring directly. In order to obtain the correct direction of operating, a reversing mechanism is required. One method of introducing reversal is to use gearing. We arrange that the drag member gears with a gear quadrant turnable about a separate shaft, an extension of which engages with the side of the contact ring remote from the shaft to rotate the contact ring when the gear quadrant is rotated. Alternatively, we may have the drag member itself mounted on a separate shaft which is geared to turn with the shaft on the controller.

In any of these systems we prefer to arrange that the additional movement or offset given to the controller, e. g., to the contact rings (which causes "initial rudder displacement) should die away with time, i. e., with a decayed action. For this purpose we may interpose a slowly leaking device, such as a dash-pot, in the connection by which the additional movement is imparted, and oppose the additional movement by a centralizing spring arrangement. Initially, the dashpot device moves as a rigid member imparting the additional movement, but it is unable to maintain this displacement against the centralizing force, so that the displacement gradually falls to zero in the absence of any further motion of the controller due to turning of the ship. By this means, yawing is suppressed in a more effective manner than with the "initial rudder" or yaw anticipating devices of the prior art, even in craft which are naturally unstable such as high speed ships and aircraft, because when the ship has returned to its original course no "initial rudder" is present to set up an incipient yaw.

Referring to the drawings showing two forms our invention may assume:

Fig. 1 is a wiring diagram showing one form of our invention.

Fig. 2 is a diagram perspective view showing a modified form of the delayed action device of Fig. 1.

Referring first to Fig. 1, the rudder 1 is shown driven through gearing 2 by an electric rudder motor 3. The field winding of this motor is permanently excited from D. C. mains 6, and the armature is supplied from a Ward-Leonard generator 4 driven by a constantly running D. C. motor 5 supplied from the D. C. mains 6 through a control panel 7, which also supplies the current for the field winding of the rudder motor 3. The excitation current for the field winding of generator 4 is derived from an exciter generator 8 whose field winding 9 is connected to the sliders 10, 11 of two potentiometers 12, 13.

Potentiometer 12 is the control potentiometer: it is called the wheel potentiometer since its slider 10 can be adjusted by the steering wheel 14. Potentiometer 13 is the rudder potentiometer: its slider 11 is actuated by the rudder motor 3, so that it has a definite position corresponding to each position of the rudder. Both potentiometers 12 and 13 are connected to the same D. C. supply 6.

The parts so far described constitute the usual form of electric steering system. Their operation is as follows: The two potentiometers 12 and 13 may be considered as a Wheatstone bridge of which the supply mains form one diagonal, while the field winding 9 of the exciter generator 8 forms the other diagonal. If the bridge is balanced there is no current in this winding, so that the generator 8 does not excite the generator 4 and motor 3 consequently does not run. However, if the balance of the bridge is upset, as for example, if the steering wheel 14 is turned, the motor 3 runs and applies rudder. The motor goes on running until the slider 11 reaches a new position on potentiometer 13, corresponding to the new position of slider 10 on potentiometer 12, whereupon the motor 3 stops as the bridge is again balanced. In this system there is no definite indication in the vicinity of the steering wheel 14 (i. e., on the bridge) of the position of the rudder. The position of slider 11 merely defines the position to which the rudder should go, so that the slider may be considered as a rudder order indication; there is no rudder indicator as such on the bridge.

In order to effect automatic steering, we provide an auxiliary potentiometer 12' and a change-over switch 115, so that the auxiliary potentiometer 12' may be energized from the D. C. mains instead of the potentiometer 12, the slider 10' being simultaneously connected to the field winding 9 of the generator 8 instead of the slider 10: the auxiliary potentiometer 12' therefore completely replaces the potentiometer 12. The slider 10' is operated by automatic means, which we shall now describe, instead of by the steering wheel 14.

The potentiometer 12' operates as the master or compass governed controller and it is shown as being turned from the gyro compass repeater motor 15 which turns shaft 16. Shaft 16 is shown as connected through adjustable lost motion device 17, which is usually known as the weather yaw preventing device, to a shaft 18 which operates one arm of the differential 19. Another arm of said differential may be operated from the hand or trick steering wheel 20 shown as mounted on the same shaft as large gear 21 which turns the central arm 22 of the differential 19. A locking handle 23 may be provided so that the repeater motor is locked when the handwheel 20 is operated and vice versa. The drive from the hand wheel 20 operates through a slip friction clutch 29. A third arm of said differential enters change speed gear box 26 and operates shaft 16'' through said change speed gear box 26 which is operated from the gear shift handle 25. Shaft 16'' operates the controller slider 10'. The gear ratio selected in the gear box 26 determines the angle turned through by the rudder corresponding to a given deviation from course, i. e., it determines the rudder ratio so that the handle 25 may be termed the rudder ratio adjustment. Shaft 16'' operates a third shaft 16''' but there is superimposed thereon a motion responsive to the initial turning of the shaft 16'' in either direction. A collar 30 is secured to shaft 16'' to form an abutment for spring 31 which precesses cone-faced clutch 32 keyed to shaft 16'' toward opposite cone faced clutch 33 fixed to shaft 16'''. Pinion 34 is frictionally driven from said clutches by being provided with a wedge shaped under annular surface. Said pinion engages rack teeth not shown on rack bar 35 which is connected by a link 36 with a lever 37 pivoted at 38. Rack bar 35, therefore, has its motion limited by an adjustable stop device comprising a block 39 with a V-shaped cutaway portion secured to the bar and a complementary shaped fixed stop 40 which may be adjusted toward the block by the adjusting screw 41 to vary the amount of motion permitted to the rack. As shaft 16'' is reversed in direction, rack 35 will be urged to the full extent of its possible motion so that the block 39 will abut on one side or the other on the stop 40. The motion of the rack bar 35 is transmitted to the shaft 16''' by the rotatable casing or center arm 42 of the differential 43 but instead of employing a rigid link between the bar 35 and the differential, we use a linkage containing a dashpot in order to secure the decaying action above referred to.

As shown, a dashpot cylinder 67 is pivoted on the lever 37 and a close fitting piston 68 therein is linked to the differential 42 by the piston rod 69. The piston rod, and consequently the differential 42, are subjected to the action of a spring centralizing device. This comprises a pin 70 on piston rod 69 and two levers 71, 72 pivoted at 75, the former adapted to force the pin downwards if the pin should lift it upwards if the pin should depress it off this stop. Both levers exert their force under the constraint of the same spring 74, which interconnects them.

The effect of the dashpot linkage and the centralizing device is as follows. Suppose that the ship has been turning anti-clockwise and that the corresponding direction of turning of shaft 16" maintains the rack 35 in a downward position. If the ship ceases turning in the anti-clockwise direction and begins to turn in a clockwise direction, the rack 35 will immediately move rapidly in the upward direction to the full distance permitted by the stop 39, giving an offset to the controller. The dashpot 67 will therefore be forced downwards and will take with it the piston 68, since the motion is rapid: initially, therefore, the differential casing 42 is rotated by an amount corresponding to the full permitted movement of the rack 35. However, the downward movement of the piston 68 and piston rod 69 depresses the lever 72 from its stop 73 and extends the spring 74. This spring exerts an upward force on the pin 70 throughout the whole time that the ship is turning clockwise, as a result of which the piston 68 slowly moves upwards in the dashpot until the pin 70 is in its central or zero position again. In order that this rate of movement may be regulated as desired, a pipe connection may be provided between the ends of the dashpot cylinder with an adjustable valve 76 for varying the constriction therebetween. Thus, the system operates to restore the arm 42 slowly towards its normal or zero position, after it has been moved therefrom as a result of a change in the direction of turn of the ship.

The motion of center arm 42 of differential 43 is superimposed on the motion of shaft 16" to operate shaft 16''', which operates a controller controlling the steering of the ship. This controller is shown in the form of a circular rheostat, with contact studs 45 arranged in a circle with their inner faces concentric with the axis of rotation of the contact arm 10'. On this arm are pivoted two levers 47, 47' each of which is spring constrained so that the rollers 48, 49 mounted on their ends are held with the light pressure with the inner cylindrical face of the studs 45. The arm 10' is shown rotated from the shaft 16''' through bevel pinion 90 and bevel gear 91.

Fig. 2 illustrates a modification of Fig. 1 with referencve to the means for obtaining the dying away or decayed action in the lost motion device. In this case, the friction drag pinion 34 is replaced by slip friction or friction drag arm 34' having a frictional connection to the shaft 16" so that said arm is oscillated between fixed stops 85 and 86 upon each reversal in the direction of rotation in the shaft 16". This motion of the arm acts to close one or the other of the pairs of contacts 87 and 88 so as to energize solenoid 89 or 90, respectively. The energized solenoid attracts an armature which is in the form of a lever 91' pivoted at 92'.

An adjustable stop device 93 may be provided whereby the amount of movement permitted to the lever 91' may be limited. This constitutes a modified form of initial rudder adjustment. The far end of the lever is shown as connected to the planetary arm or ring 42 of the differential 43 which as before, operates between shaft 16" and 16''' to actuate the master controller 46 such as shown in Fig. 1. The linkage between the lever 91' and the planetary arm 42 is shown as containing a dashpot and centralizing device 67—76 similar to that shown in Fig. 1.

The system of Fig. 2 operates the steering controller, i. e, operates shaft 16''' in almost exactly the same manner as does the system of Fig. 1, for the movement imparted to planetary arm 42 is in both cases due to the movement of the friction drag member (by gear 34 or arm 34'), the main difference being that in Fig. 1 the operation is by direct mechanical means, whereas in Fig. 2 an electro-mechanical relay is employed. While the use of a relay introduces an additional mechanism, it has advantages since the system of Fig. 1 has to be rather nicely adjusted throughout with respect to friction and other loadings, whereas the system of Fig. 2 is more robust.

From the foregoing it is believed that the operation of our invention will be apparent and the advantages thereof over the prior art yaw-preventing or "initial rudder" devices. In the prior art devices, as reprsented in said Sperry patent, the initial rudder, once applied, remains until the ship reverses its direction of yaw when it is reversed. In applicant's device, on the other hand, by reason of the self-centralizing dashpot the lost motion is gradually eliminated and the rudder is always brought back to its mid position after an interval so that, upon a new yaw in either direction, the initial rudder will be brought into play immediately in the proper direction. In other words, in the prior systems a certain amount of initial rudder usually remains by the time the ship gets back to course, thus tending to set up another yaw, while in applicant's case the initial rudder is substantially removed by this time, thus removing one cause of yawing. It will also be obvious that in its broad aspects our invention is adaptable to all lost motion type yaw suppressors, whether incorporated in a Ward-Leonard type of follower-back or in a mechanical type followback of the prior art, in which the lost motion is usually supplied within the follow-back connection itself, as shown in siad Sperry patent.

It is also apparent that by suitable adjustments of the tension of spring 74 and/or the rate of leak through the piston 68 in the dashpot cylinder, the rate of elimination of the initial rudder may be varied to suit the needs of the individual craft. In fact, this rate may be adjusted so that the initial rudder is not completely removed until the ship has passed its original course and is about to change its direction of yaw, if desired. If any initial rudder remains at this time, it will of course be removed and initial rudder applied in the opposite direction upon reversal of yaw.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an automatic steering device for craft, a controller the relative position of which is primarily governed by the heading of the craft with respect to the compass, a rudder servo motor actuated therefrom, additional means responsive to a change in the direction of yaw of the craft to give said controller an offset to impart an "initial rudder" movement to said servo motor, and means for decreasing said offset to reduce said initial movement as the craft returns to its course.

2. In an automatic steering device for craft, a controller the relative position of which is primarily governed by the heading of the craft with respect to the compass, a rudder servo motor actuated therefrom, and additional means responsive to a change in the direction of yaw of the ship to give said controller an offset to impart an initial rudder movement to said servo motor, including a linkage system and a spring centralized dashpot therein having a slow leak, whereby said offset is gradually reduced as the craft returns to its course.

3. In an automatic steering device for craft, a controller the relative position of which is primarily governed by the heading of the craft with respect to the compass, a rudder servo motor actuated therefrom, and additional means responsive to a change in the direction of yaw of the craft to give said controller an offset to impart an initial rudder movement to said motor, including a member oscillated a short distance upon change in direction of yaw of the craft, electrical contacts adapted to be closed by said member at each end of its oscillation, magnetic means alternately energized thereby to oscillate an armature, and a spring centralized slow leak dashpot connected between said armature and said controller, whereby said offset is reduced as the craft returns to course.

4. In an automatic steering gear for dirigible craft, a compass governed controller, a steering potentiometer comprising two arms of a Wheatstone bridge circuit, one arm of which is adjusted by said controller, a rudder controlling motor, the other arm of said bridge circuit being adjustable by said motor, means for controlling said rudder motor as to speed and direction of operation in accordance with the potential difference between the bridge points of said circuit, an initial rudder device arranged to further adjust one arm of said bridge circuit and actuated upon reversal in the direction of yaw of the craft for superimposing on the rudder movement imposed by the compass a further movement of limited magnitude in one direction or the other in accordance with the direction in which the ship is yawing, and means for causing said further adjustment imposed by said initial rudder device to be substantially reduced before the craft reverses its direction of yaw.

5. In an automatic steering device for craft, a controller the relative position of which is primarily governed by the heading of the craft with respect to a compass, a rudder servo motor actuated therefrom, and additional means responsive to a change in the direction of yaw of the craft to give said controller an offset to impart an "initial rudder" movement to said servo motor, said means including a timed decaying device interposed between said means and said controller, whereby the effect of said means is slowly reduced to zero after each initial rudder movement.

6. In an automatic steering device for craft a controller the relative position of which is primarily governed by the heading of the craft with respect to a compass, a rudder servo motor actuated therefrom, additional means responsive to a change in the direction of yaw of the craft to give said controller an offset to impart an "initial rudder" movement to said servo motor, means for decreasing said offset to reduce said initial movement as the craft returns to its course, and means for adjusting said first named means to adjust the extent of the initial rudder movement.

GEORGE CECIL SAUL.
WILLIAM GEORGE HARDING.
ROBERT HAYES NISBET.